United States Patent [19]

Centea et al.

[11] Patent Number: 5,458,275

[45] Date of Patent: Oct. 17, 1995

[54] POSITIVE-DISPLACEMENT DISPENSING DEVICE

[75] Inventors: Mark E. Centea, Akron, Ohio; Kenneth L. Miller, Indianapolis, Ind.

[73] Assignee: Liquid Control Corporation, North Canton, Ohio

[21] Appl. No.: 273,350

[22] Filed: Jul. 11, 1994

[51] Int. Cl.[6] .................................................. G01F 11/06
[52] U.S. Cl. ......................... 222/309; 222/334; 222/389; 222/559
[58] Field of Search .................................. 222/258, 259, 222/260, 261, 262, 263, 287, 309, 334, 386, 387, 389, 559

[56] References Cited

U.S. PATENT DOCUMENTS

| | | | |
|---|---|---|---|
| 3,095,125 | 6/1963 | Bundy | 222/309 |
| 3,714,943 | 2/1973 | Yanof et al. | 222/389 X |
| 3,850,348 | 11/1974 | Bessot et al. | 222/389 X |
| 3,965,945 | 6/1976 | Ross | 222/309 X |
| 4,095,722 | 6/1978 | Miller | 222/1 |
| 4,293,010 | 10/1981 | Winiasz | 222/309 X |
| 4,634,027 | 1/1987 | Kanarvogel | 222/389 X |
| 4,942,984 | 7/1990 | Miller | 222/309 |
| 5,022,556 | 6/1991 | Dency et al. | 222/309 X |
| 5,092,492 | 3/1992 | Centea | 222/137 |
| 5,205,439 | 4/1993 | Sturm | 222/559 X |

Primary Examiner—Andres Kashnikow
Assistant Examiner—Joseph A. Kaufman
Attorney, Agent, or Firm—Sand & Sebolt

[57] ABSTRACT

A hand-held dispensing device for dispensing small shots of a semi-solid material from a remote supply of such material which is connected to the device. A housing is formed with upper and lower pressure chambers. An upper piston is reciprocally movable within the housing for moving a connected dispensing tube between open and closed positions with a material outlet opening in a lower end of the device. A lower piston is reciprocally movable within the housing for moving a hollow stem of the piston within an annular dispense chamber located about a closed end of the dispensing tube. Downward movement of the lower piston stem in coordination with upward movement of the upper piston opens and closes a material outlet port formed in the dispensing tube to block further flow of material into the dispense chamber generally simultaneously with the forced discharge of the material from the dispense chamber by a lower end of the lower piston stem. Air passages formed in the stem of the upper piston provide an inflow of pressurized air for controlling the downward movement of the lower piston and the upward movement of the upper piston.

17 Claims, 3 Drawing Sheets

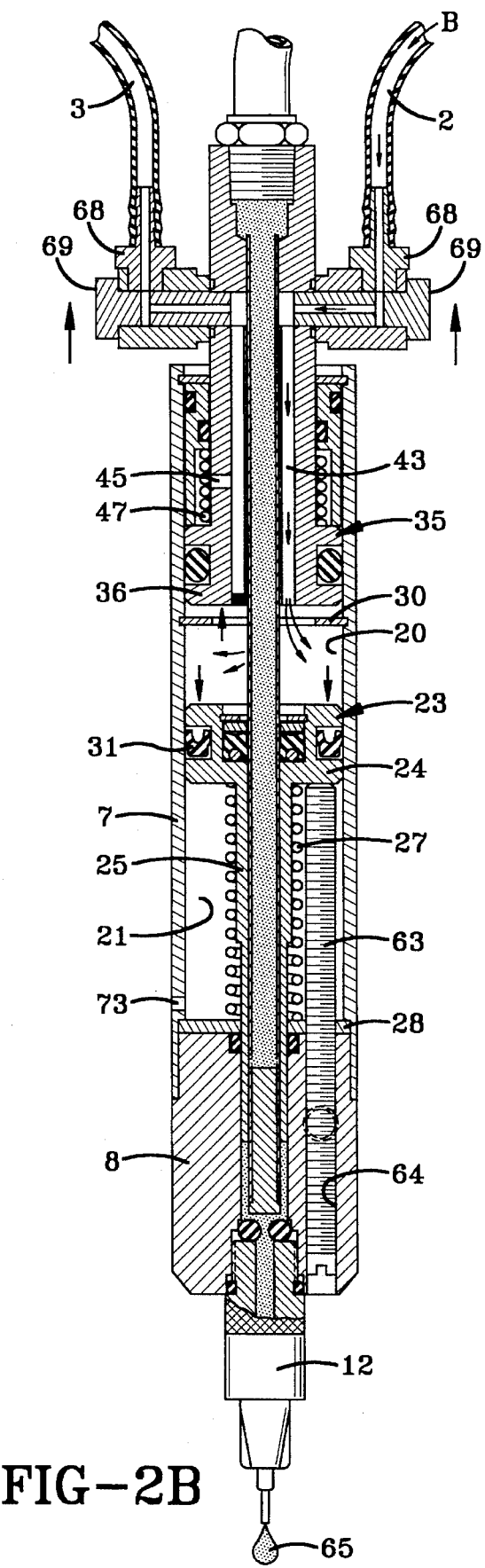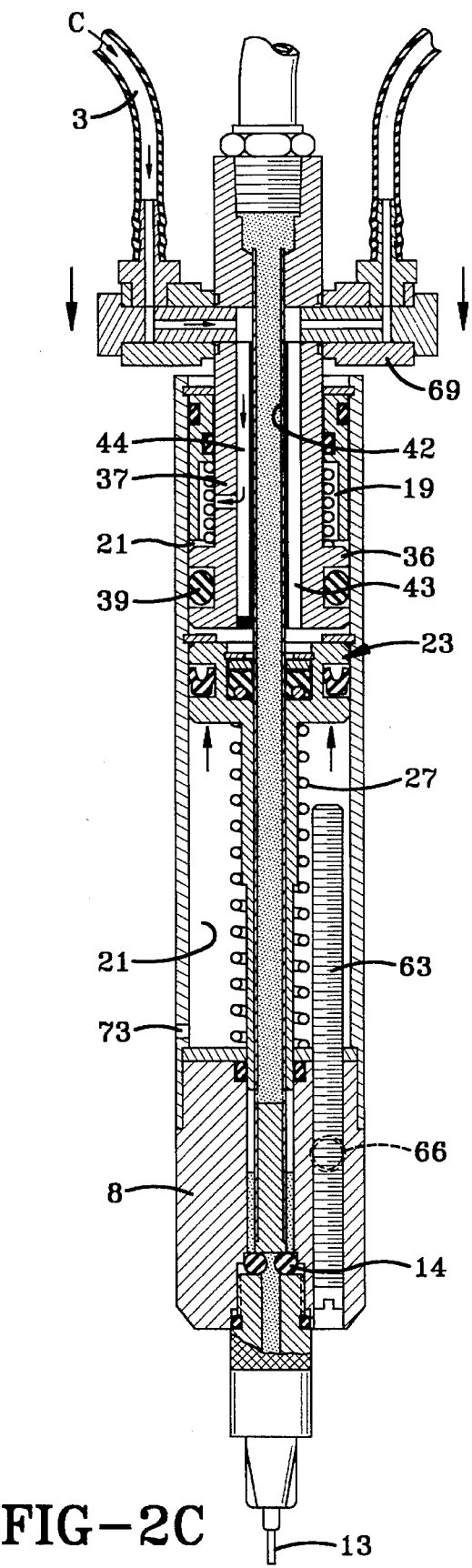

5,458,275

POSITIVE-DISPLACEMENT DISPENSING DEVICE

BACKGROUND OF THE INVENTION

1. Technical Field

The invention relates to a device which is useful for rapidly dispensing precise quantities of a viscous material, preferably semi-solid in nature, such as various resins, solder paste, grease, etc. in exact locations. In particular, the invention relates to a compact, lightweight, hand-held device for accurately dispensing small drops or "shots" of material, e.g., about 0.5 cc, in a relatively rapid fashion.

2. Background Information

The dispensing of extremely small amounts or shots of semi-solid materials at precise locations in a rapid manner presents a challenge to those in the dispensing art due to the miniature solids contained in many of the materials to be dispensed, as well as the high viscosity of the materials. Various devices have been developed for the dispensing of precise amounts of such materials, such as air-driven syringes, peristaltic pumps, gear displacement arrangements and positive-displacement pumps. Although these devices do provide for the satisfactory dispensing of such materials, the equipment is relatively bulky and expensive, and is usually intended to be mounted on robots or at stationary work locations. Thus, the need exists for a lightweight, easily manipulated, hand-held, positive-displacement dispenser which will accurately and rapidly dispense very small shots of a semi-solid material at an exact location.

One type of dispenser for achieving this result is shown in U.S. Pat. No. 4,942,984, the contents of which are incorporated herein by reference. Although this dispenser achieves its desired results in a relatively simple manner, it requires the use of three separate incoming pressurized air lines for operating the movable pistons located internally in the hand-held housing. The present invention is an improvement upon the dispenser of U.S. Pat. No. 4,942,984, and enables the unit to be more compact and easily manipulated, and requires only two incoming air lines, both of which are located at the top part of the hand-held housing adjacent the incoming material supply line.

OBJECTIVE OF THE INVENTION

Objectives of the invention include providing an improved positive-displacement dispensing device, preferably of a compact lightweight nature, enabling it to be hand held and manipulated, for depositing exact amounts of an extremely small shot of a high viscous material at a precise location in a relatively rapid sequence of operations.

A further objective of the invention is to provide such a dispensing device which includes two internally reciprocally driven pistons which provide for the dispensing of the material shot, and in which the size of the shot can be adjusted easily within a desired range.

A still further objective of the invention is to provide such a dispensing device which can be disassembled easily for removal of the internal components located within an outer protective housing for cleaning and repair, should the same be required.

Another objective of the invention is to provide such a simple, inexpensive, yet rugged and durable, hand-held dispensing device which achieves the objectives in a simple and efficient manner.

These objectives and advantages are obtained by the improved dispensing device of the present invention, the general nature of which may be stated as including a housing having a material inlet opening and a material outlet opening, a material dispense chamber communicating with the material outlet opening, and upper and lower pressure chambers; an upper piston reciprocally movably mounted in the upper pressure chamber, said upper piston having a head and a hollow stem; a lower piston reciprocally movably mounted in the lower pressure chamber, said lower piston having a head and a hollow stem; a dispensing tube communicating with the material inlet opening and with the material dispense chamber of the housing for transmitting material to be dispensed from a remote supply of such material to the dispense chamber, said tube being operatively reciprocally movable with the upper piston and passes through the hollow stem of the lower piston, said material outlet opening being closed when the tube is in a lower position and open when said tube is in a raised position; a material discharge port formed in the dispensing tube for transmitting material from the material inlet opening through the tube and into the material dispense chamber; and means for selectively introducing pressurized air into the upper and lower pressure chambers for moving the upper piston and correspondingly the dispensing tube to the raised position to open the material outlet opening, and for moving the lower piston and corresponding moving the hollow stem of said lower piston into the material dispense chamber to block the outlet port of the dispensing tube and to force material from the dispense chamber and out through the outlet opening.

BRIEF DESCRIPTION OF THE DRAWINGS

A preferred embodiment of the invention, illustrative of the best mode in which applicants have contemplated applying the principles, are set forth in the following description and are shown in the drawings and are particularly and distinctly pointed out and set forth in the appended claims.

FIG. 2B is a view similar to FIGS. 2 and 2A showing the dispensing tube in a raised open position and the lower piston stem dispensing a shot of material from the dispense chamber;

FIG. 2C is a sectional view similar to FIGS. 2–2B showing the lower piston in a raised retracted position and the dispensing tube in a lowered closed position, permitting a new supply of material to fill the dispense chamber;

DESCRIPTION OF THE PREFERRED EMBODIMENT

Figure 1:
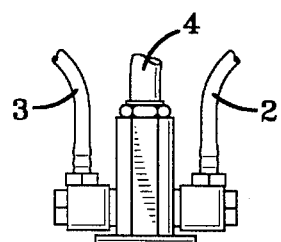
FIG. 1 is an elevational view of the dispenser of the present invention.
Figure 3:
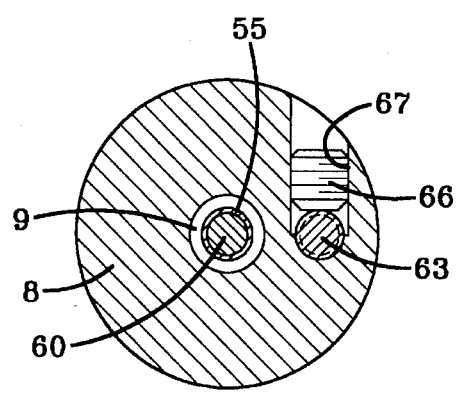
FIG. 3 is an enlarged sectional view taken on line 3—3, FIG. 2.
Figure 4:
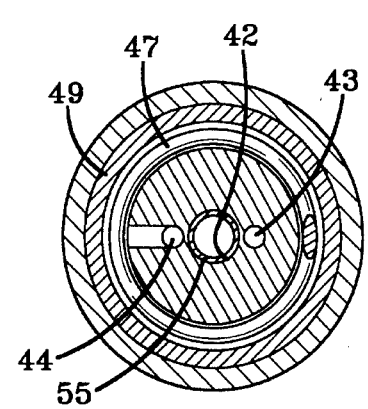
FIG. 4 is an enlarged sectional view taken on line 4—4, FIG. 2.
Figure 5:
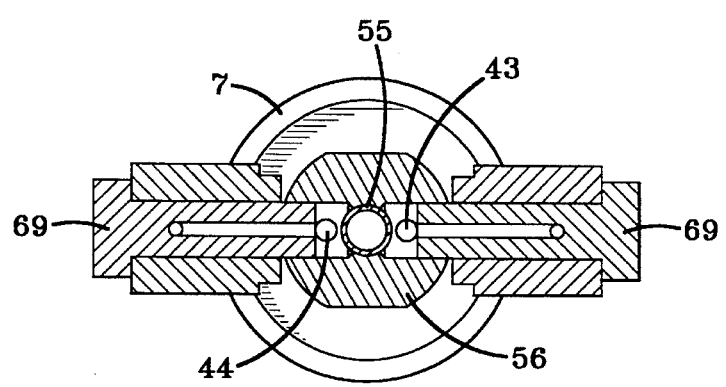
FIG. 5 is an enlarged sectional view taken on line 5—5, FIG. 2.

The improved dispenser of the present invention is indicated generally at 1, and is shown in elevation in FIG. 1 with two pressurized air supply lines 2 and 3 extending from a remote source of pressurized air, such as a compressor (not shown), and having a material inlet line 4 extending between dispenser 1 and a remote supply of material (not shown) to be dispensed by the dispenser. The particular material being dispensed may vary, but will usually be a semi-solid material, such as a resin, grease, solder paste, or the like, which is not free flowing by itself but will flow under moderate pressure.

The main components of improved dispenser 1 are shown particularly in FIGS. 2–5, and include a main housing, indicated generally at 6, having a hollow cylindrical outer shell 7 and a solid lower dispense end portion 8. A hollow bore 9 is formed in end portion 8 and terminates in a threaded opening 10 in which is mounted an attachment holder 12 for holding a dispensing tip 13. An O-ring 14 preferably is compressed between a stepped portion 15 of bore 9 and attachment holder 12, and forms a material flow passage or outlet opening 16 through the center thereof.

Housing shell 7 is provided with upper and lower pressure chambers 19 and 20, respectively. The term "lower" is referred to throughout as being oriented toward the dispensing end or tip 13, with the term "upper" referring to the direction oriented towards the incoming pressure and material supply end. This is also the usual orientation that the dispenser will assume during normal usage. A lower piston assembly, indicated generally at 23, includes an annular piston head 24, which is reciprocally slidably mounted within the hollow interior 21 of housing shell 7, and forms the lower limit of lower pressure chamber 20 (FIG. 2B). Piston assembly 23 includes a hollow longitudinally extending piston stem 25 which extends through hollow interior 21 of shell 7 and into bore 9 of solid end portion 8 of the housing.

A compression coil spring 27 surrounds stem 25 and extends between piston head 24 and a stop ring 28 which separates shell interior 21 from solid end portion 8. Spring 27 biases piston head 24 upwardly until head 24 engages a stop ring 30 which is located within lower pressure chamber 20. An outer annular sealing ring 31 is located within an annular groove 32 formed in piston head 24 to provide a sealing sliding engagement with the interior surface of housing shell 7.

Figure 2:
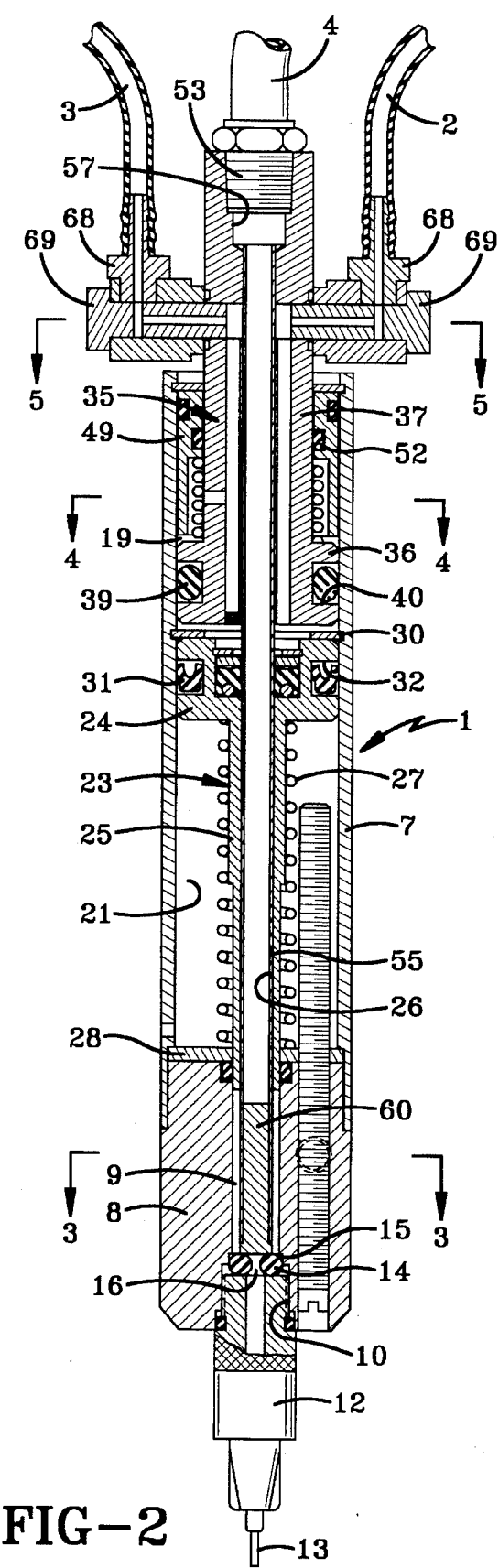
FIG. 2 is an enlarged longitudinal sectional view of the dispenser of FIG. 1 with the reciprocating dispensing tube shown in closed position and the lower piston stem shown in an upper position.

An upper piston assembly, indicated generally at 35, includes a piston head 36 and a hollow stem 37 extending longitudinally upwardly therefrom. Piston head 36 also is provided with a sealing O-ring 39 located within an annular groove 40 so as to provide a sealing sliding engagement with the interior surface of housing shell 7. Stem 37 is formed with a hollow central bore 42 and a pair of pressurized air inlet passages 43 and 44 (FIG. 4) which extend generally parallel with bore 42. Air passage 44 communicates with upper pressure chamber 19 through a radially extending air port 45, with air passage 43 communicating with lower pressure chamber 20. A compression coil spring 47 surrounds piston stem 37 and biases piston head 36 toward lower pressure chamber 20 until it reaches its lower limit where a dispensing tube 55, which is attached thereto, closes outlet opening 16 (FIG. 2). Air passage 44 may extend completely through stem 36 but will be closed with a plug 48 for ease of manufacture, if desired. Spring 47 extends within a spring cup 49, which is retained within the upper end of housing shell 7 by snap ring 51. Spring cup 49 will contain a plurality of O-rings 52 to provide an air seal for upper pressure chamber 19. Spring cup and snap ring 51 enables the various components to be assembled within the housing, with the interior of the spring cup also forming a portion of the upper pressure chamber.

In accordance with one of the features of the invention, hollow cylindrical dispensing tube 55 is connected to a material inlet attachment block 56 and communicates with a material inlet opening 57 (FIG. 2) formed therein, which communicates with material inlet line 4 by means of a coupling 53. Tube 55 extends through bore 42 of upper piston stem 37 and through bore 26 of stem 25 of lower piston 23. The free or lower end of tube 55 extends into bore 9 of housing end portion 8 and forms an annular material dispense chamber 59 between the outer surface of tube 55 and the internal surface of bore 9 of solid end portion 8. Annular dispense chamber 59 communicates with material outlet opening 16 of dispenser 1. The outer diameter of dispensing tube 55 is complementary to the inner diameter of stem bore 26, so as to provide a sliding sealing engagement therebetween. The lower end of tube 55 is closed by a plug 60 which stops adjacent a pair of radially extending material outlet ports 61 formed in tube 55, as shown particularly in FIGS. 2A and 6.

An adjustment screw 63 is adjustably mounted within a threaded passage 64 formed longitudinally through solid end portion 8 of housing 6 and extends into interior 21 of shell 7 for limiting the downward stroke of piston head 24, as shown in FIG. 2B. Screw 63 regulates the size of a shot of material, indicated at 65, to be dispensed from dispenser 1. A set screw 66 (FIG. 3) is located within an internally threaded hole 67 formed in solid end portion 8 for locking adjustment screw 63 in an adjusted position.

Pressurized air lines 2 and 3 are connected to individual couplers 68 which are threadably mounted into a second pair of couplers 69, which in turn are threadably mounted on and engaged with stem 37. Couplers 68 and 69 are formed with air inlet passages whereby air line 2 communicates with air passage 43, and air line 3 communicates with air passage 44.

Figure 6:
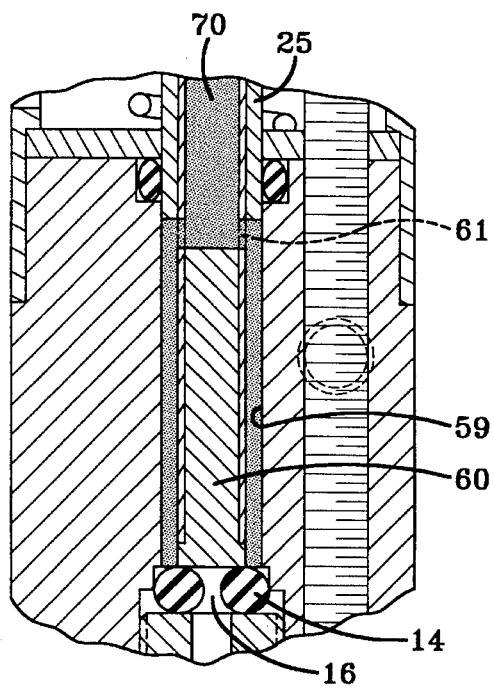
FIG. 6 is a greatly enlarged fragmentary sectional view of the lower portion of FIG. 2A.
Figure 2A:
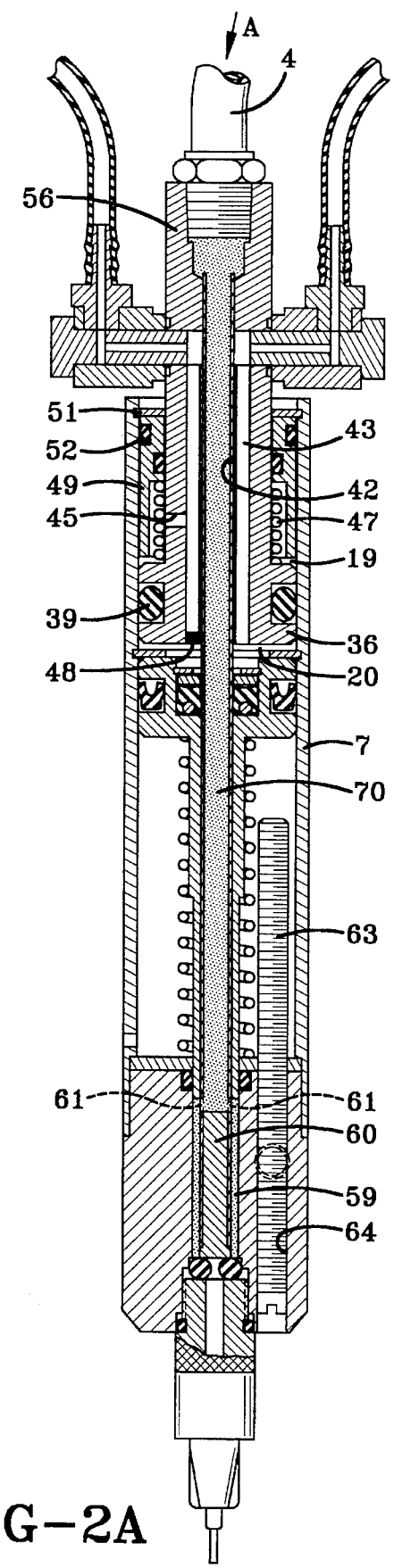
FIG. 2A is a sectional view similar to FIG. 2 showing the dispenser when in the closed material-filled condition prior to dispensing material therefrom.

The operation of improved dispenser 1 is as follows. FIG. 2 shows the positions of the upper and lower piston assemblies prior to the dispenser being filled with an incoming material. In this position, coil spring 27 biases piston head 24 to its uppermost position against stop ring 30, and coil spring 47 biases upper piston head 36 to its lowermost position, wherein plug 60 of tube 55 is in a closed sealing engagement with O-ring 14. As shown in FIG. 2A, material 70 enters through material inlet line 4, as shown by arrow A, and flows through the interior of dispensing tube 55 and through outlet ports 61, as shown in FIG. 6, completely filling annular dispense chamber 59 with material. As noted in FIG. 6, piston stem 25 is above material ports 61, permitting the free flow of material through the hollow interior of dispensing tube 55 and into annular dispense chamber 59, where the material is prevented from flowing through material outlet opening 16 by the pressing engagement of tube plug 60 with O-ring 14.

Figure 7:
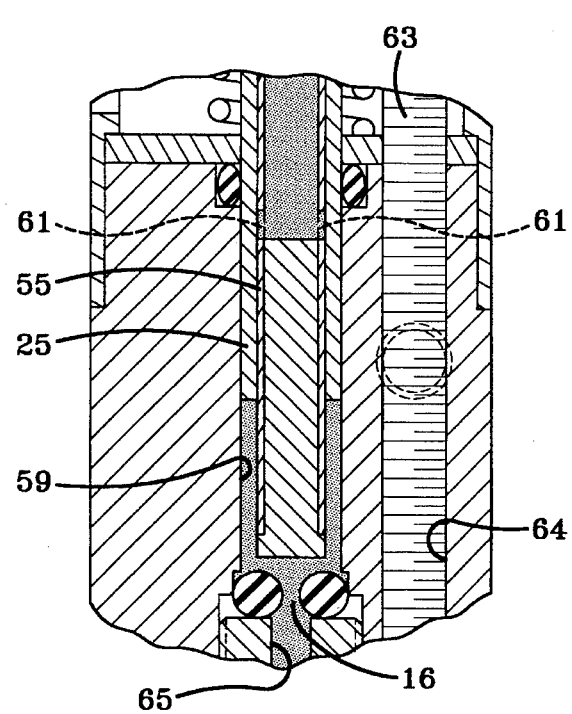
FIG. 7 is a greatly enlarged fragmentary sectional view of the lower portion of FIG. 2B.

Referring to FIG. 2B, in order to dispense a material shot 65, pressurized air, indicated by arrow B, flows through line 2 and through air passage 43, and into lower pressure chamber 20 where it forces lower piston assembly 23 downwardly, generally simultaneously with forcing upper piston assembly 35 upwardly. Referring to FIGS. 6 and 7, this coordinated action moves the lower end of piston stem 25 downwardly past material outlet ports 61 of dispensing tube 55, which tube has also moved upwardly, unblocking material outlet opening 16, as shown in FIG. 7. This permits the flow of material through opening 16 due to the downward movement of the lower end of piston stem 25, which is complementary to the annular interior of dispense chamber 59, thereby forcing the material 70 contained therein outwardly to form material shot 65, as shown in FIG. 2B.

After piston head 24 reaches its lowermost limit, as shown in FIG. 2B, where it engages adjustment screw 63, pressurized air will be shut off through line 2 and will now enter air line 3, as shown by arrows C (FIG. 2C). This will enable spring 27 to return lower piston assembly 23 to its uppermost position, as shown in FIG. 2C. Incoming air will enter upper pressure chamber 19 and will move piston head 36 downwardly, which will move dispensing tube 55, which is fixedly mounted with respect thereto, downwardly to its closed position against O-ring 14. An air outlet hole 73 is formed in housing shell 7 and communicates with lower interior 21 of shell 7 to prevent the formation of a vacuum therein as lower piston assembly 23 moves reciprocally within the housing shell.

Thus, dispenser 1 provides an extremely compact and lightweight dispenser adapted to be hand held for dispensing small drops or shots of a semi-solid liquid in a positive controlled manner through the simple but effective reciprocating action of a pair of internally mounted piston assemblies.

It is readily understood that air lines 2 and 3 and material inlet line 4 are connected to usual sources of air and material, and that the flow of the material and pressurized air is controlled by usual electronic means which may be programmed to provide for a series of repetitive dispensing of material shots 65 by programming a control computer therefor. Alternatively, dispenser 1 may be individually regulated by the operator by the use of a foot pedal or other control switch connected to the source of air and material. As indicated above, the flow of the incoming air in lines 2 and 3 controls the opening and closing of the material outlet opening and the movement of the lower piston stem for discharging the material therefrom.

Accordingly, the dispensing device is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved dispensing device is constructed and used, the characteristics of the construction, and the advantageous, new and useful results obtained; the new and useful structures, devices, elements, arrangements, parts and combinations, are set forth in the appended claims.

We claim:

1. A positive displacement dispensing device including:

a housing having a material inlet opening and a material outlet opening, a material dispense chamber communicating with the material outlet opening, and upper and lower pressure chambers;

an upper piston reciprocally movably mounted in the upper pressure chamber, said upper piston having a head and a hollow stem;

a lower piston reciprocally movably mounted in the lower pressure chamber, said lower piston having a head and a hollow stem;

a dispensing tube communicating with the material inlet opening and with the material dispense chamber of the housing for transmitting material to be dispensed from a remote supply of such material to the dispense chamber, said tube being operatively reciprocally movable with the upper piston and passes through the hollow stem of the lower piston, said material outlet opening being closed when the tube is in a lower position and open when said tube is in a raised position;

a material discharge port formed in the dispensing tube for transmitting material from the material inlet opening through the tube and into the material dispense chamber; and means for selectively introducing pressurized air into the upper and lower pressure chambers for moving the upper piston and correspondingly the dispensing tube to the raised position to open the material outlet opening, and for moving the lower piston and corresponding moving the hollow stem of said lower piston into the material dispense chamber to block the outlet port of the dispensing tube and to force material from the dispense chamber and out through the outlet opening.

2. The dispensing device defined in claim 1 including an adjustment screw attached to the housing for engaging the lower piston to modify the downward movement of said lower piston, and correspondingly, by the downward movement of the stem of said lower piston into the dispense chamber.

3. The dispensing device defined in claim 1 in which a material inlet line and a pair of pressurized air lines are connected to the upper piston and communicate with the material inlet opening and with the means for introducing air into the upper and lower pressure chamber, respectively.

4. The dispensing device defined in claim 1 in which the means for introducing pressurized air into the upper and lower pistons includes air passages formed in the stem of the upper piston which selectively communicate with the upper and lower pressure chambers for selectively moving the lower piston toward the material outlet opening whereby the stem of the lower piston moves into the material dispense chamber, and for selectively moving the upper piston in an opposite direction from the movement of the lower piston whereby a closed end of the dispensing tube opens the material outlet opening.

5. The dispensing device defined in claim 4 in which first spring means is mounted in the housing and engages the lower piston for biasing the lower piston towards the lower pressure chamber and upper piston.

6. The dispensing device defined in claim 5 in which the first spring means includes a compression coil spring which surrounds the stem of the lower piston.

7. The dispensing device defined in claim 4 in which second spring means is located within the upper pressure chamber for biasing the upper piston downwardly towards and into the lower pressure chamber.

8. The dispensing device defined in claim 4 in which the air passages includes a first passage extending between a first pressurized air inlet port and the upper pressure chamber, and a second passage extending between a second pressurized air inlet port and the lower pressure chamber.

9. The dispensing device defined in claim 8 in which the first and second passages are formed in an upper portion of the stem of the upper piston.

10. The dispensing device defined in claim 8 in which the stem of the upper piston has a central bore; and in which the first and second air passages extend generally parallel with the central bore of said upper piston.

11. The dispensing device defined in claim 1 in which a stop ring is fixedly mounted in the housing and located within the lower pressure chamber to limit the upward travel of the lower piston.

12. The dispensing device defined in claim 1 in which a vent opening is formed in the housing to prevent the formation of a vacuum in an enclosed area of the housing between the head of the lower piston and the material outlet opening.

13. The dispensing device defined in claim 1 in which the housing includes a hollow cylindrical shell slidably containing the upper and lower pistons and a solid cylindrical end portion; and in which the material outlet opening and dispense chamber are formed in said solid end portion.

14. The dispensing device defined in claim 13 in which a threaded passage is formed in the solid end portion of the housing; and in which a stroke adjustment screw is threadedly engaged in said threaded passage and extends into the hollow cylindrical shell and engages the lower piston to limit the movement of the stem of said lower piston into the dispense chamber.

15. The dispensing device defined in claim 1 in which a portion of the dispensing tube has an outside diameter complementary to an inside diameter of the stem of the lower piston to provide a sliding engagement therebetween.

16. The dispensing device defined in claim 1 in which a plug is mounted in an open end of the dispensing tube to provide a closed end; in which a flexible seal is located adjacent the material outlet opening; and in which the closed end of the dispensing tube engages the flexible seal to close said outlet opening.

17. The dispensing device defined in claim 16 in which the material discharge port of the dispensing tube is located adjacent the plug.

\* \* \* \* \*